United States Patent [19]

Naito

[11] Patent Number: 5,001,698
[45] Date of Patent: Mar. 19, 1991

[54] READ-OUT INFORMATION SIGNAL PROCESSING CIRCUIT IN AN OPTICAL RECORDING AND REPRODUCING SYSTEM

[75] Inventor: Ryuichi Naito, Tokorozawa, Japan

[73] Assignee: Pioneer Electronic Corporation, Tokyo, Japan

[21] Appl. No.: 561,379

[22] Filed: Aug. 1, 1990

Related U.S. Application Data

[63] Continuation of Ser. No. 302,672, Jan. 27, 1989, abandoned.

[30] Foreign Application Priority Data

Jul. 15, 1988 [JP] Japan .................................. 63-176663

[51] Int. Cl.$^5$ .............................................. G11B 7/00
[52] U.S. Cl. .................................................. 369/59
[58] Field of Search ......................................... 369/59

[56] References Cited

U.S. PATENT DOCUMENTS

| | | | |
|---|---|---|---|
| 4,542,421 | 9/1985 | Fujiboyoshi | 360/62 |
| 4,628,373 | 12/1986 | Tokohoshi et al. | 360/62 |

*Primary Examiner*—Vincent P. Canney
*Attorney, Agent, or Firm*—Wegner, Cantor, Mueller & Player

[57] ABSTRACT

A read-out information signal processing circuit having a switching device for relaying the read-out information signal read-out from a recording medium in an optical recording and reproducing system. The read-out information signal relayed by the switching device is supplied to an A/D converting circuit through DC interrupt means. The switching device is turned off during the recording period. Thus, the variations of DC level supplied to the A/D converting circuit at the transient time from a recording mode to a reproducing mode can be prevented and the dynamic range of A/D converting circuit can be effectively used.

3 Claims, 5 Drawing Sheets

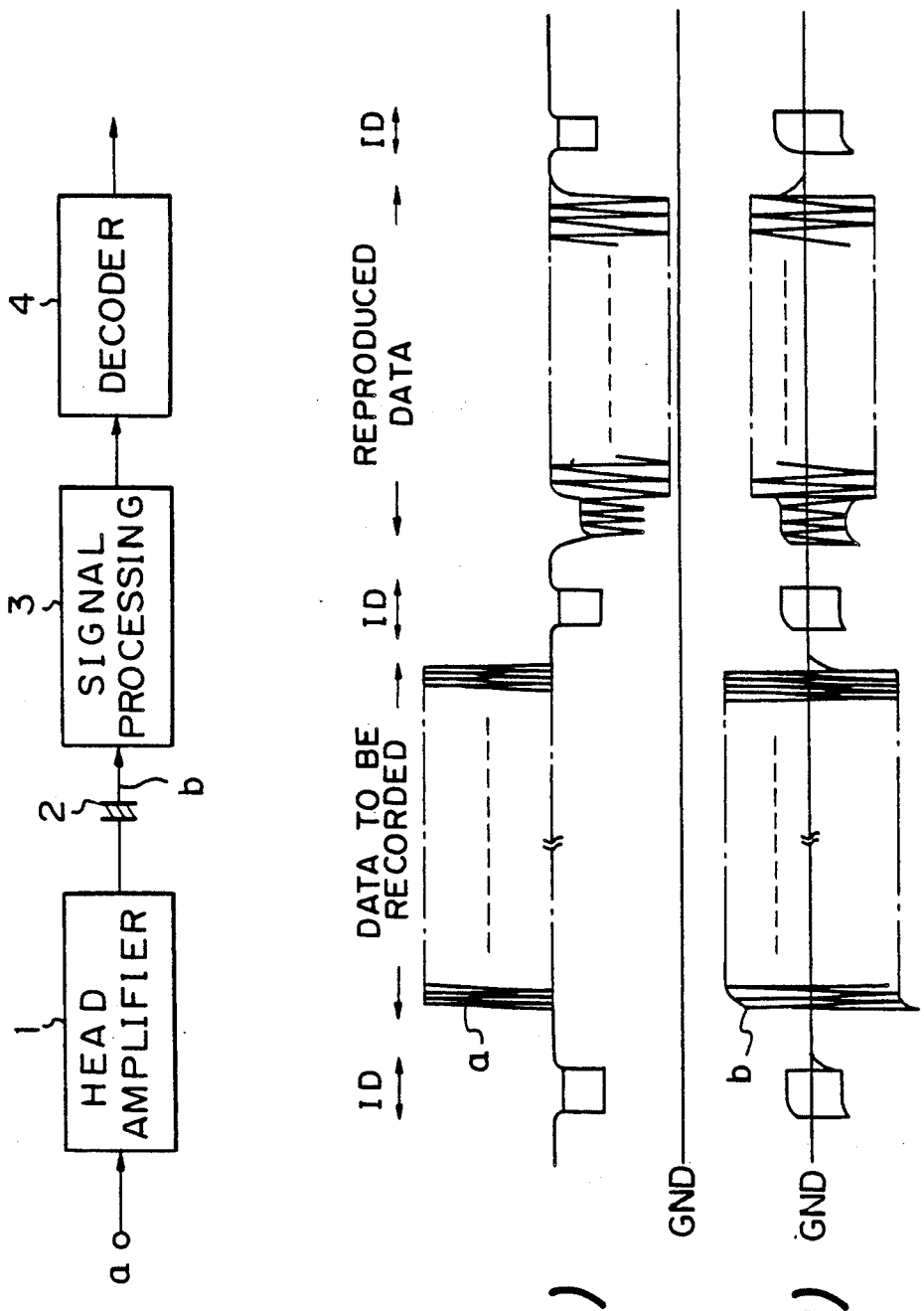

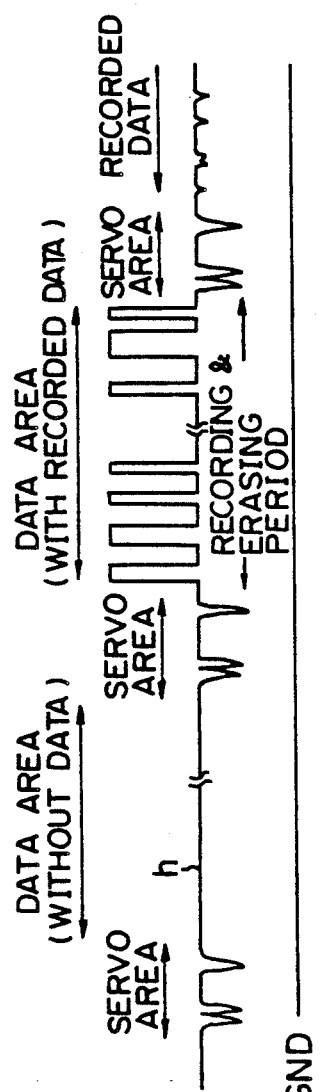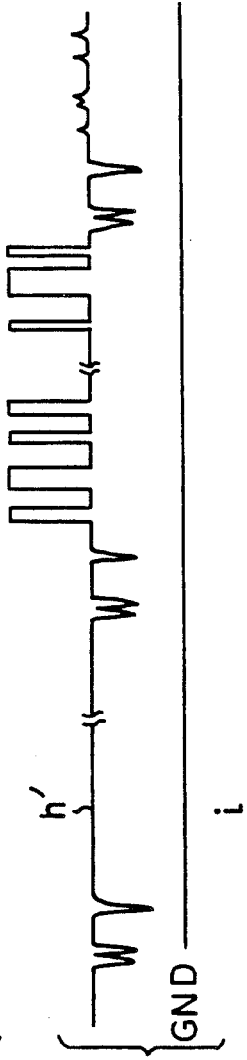

READ-OUT INFORMATION SIGNAL PROCESSING CIRCUIT IN AN OPTICAL RECORDING AND REPRODUCING SYSTEM

This application is a continuation of United States application Ser. No. 07/302,672, filed Jan. 27, 1989, now abandoned.

BACKGROUND OF THE INVENTION

1. Field of the Invention

The present invention relates to a read-out information signal processing circuit, and more particularly to a read-out information signal processing circuit incorporated in an optical recording and reproducing system.

2. Description of the Background Information

In an optical recording and reproducing system using an optical recording medium such as an optical disc and so on, the tracking servo signal may be recorded on the recording medium under the so-called continuous servo format or sampled servo format. The continuous servo format is formed as continuous grooves or lands along the respective tracks. In the sampled servo format, two wobbled pits for tracking and one clock pit for synchronization are formed in each servo area of each track. The wobbled pits and the clock pits are previously formed and are usually referred to as emboss pits or prepits.

FIG. 1 is a block diagram showing a read-out information signal processing circuit in an optical recording and reproducing system for the continuous servo format. In FIG. 1, a read-out information signal (referred to as an RF signal hereinbelow) from a pickup (not shown) is supplied to a head amplifier 1. The RF signal is supplied to a signal processing circuit 3 through a coupling condenser 2 after being amplified by the head amplifier 1. The signal processing circuit 3 performs such a signal processing that equalizes the RF signal to generate a binary signal by slicing the resultant signal at a predetermined level. The output signal of the signal processing circuit 3 is supplied to a decoder 4 for decoding the binary signal. An address and so on including an ID (identifier) signal previously formed as prepits are read out from the output signal of the decoder 4.

In the continuous servo format, data blocks are successively recorded on the recording medium and the RF signal (a) which is read out by the pickup from the recording medium and supplied to the head amplifier 1 has such a waveform as shown in FIG. 2(A). When the recording and reproducing system reads out the ID signal from an ID area of a certain block and irradiates a recording light beam onto a data area succeeding to the particular ID area while the recording light beam is controlled in accordance with a data signal to be recorded. The reflected light from the irradiated position on the disc is received by the pickup, and the RF signal corresponding to the data signal is read out by the signal processing circuit 3. When the recording mode is changed to the reproducing mode, the ID signal and the data signal are read out from the ID area and the data area of a block, respectively. The read-out RF signal during the recording period has a relatively high intensity because the recording light beam is relatively strong. On the other hand, the read-out RF signal during the reproducing mode has relatively low intensity. As a result, the mean level of the RF signal varies stepwise when the operation changes from the recording mode to the reproducing mode. In this instance, it is to be understood that the time constant of the condenser 2 becomes small enough (a cut-off frequency becomes higher than 30 KHz, for example) and it is possible to fully exclude the DC component so that an output signal (b) passed from the condenser 2 has such a waveform as shown in FIG. 2(B). The output signal is compared with the ground level (GND) to produce a binary signal which is then decoded to reproduce the ID signal and the data signal.

FIG. 3 is a block diagram showing a read-out information signal processing circuit in an optical recording and reproducing system adapted for the sampled servo system. An RF signal (c) read out by the pickup has such a waveform as shown in FIG. 4(A). In this case, the read RF signal corresponds to a block without any recorded data, another block with recorded data, and an ID block arranged in sequence along a track. The readout RF signal is supplied through a condesner 11 to an amplifier 12 which amplifies the RF signal. An output signal (d) from the amplifier 12 is supplied to an A/D (Analog to Digital) converting circuit 13. Since the data under the sampled servo format is, for example, 4–15 modulated and the A/D conversion is necessary.

It is necessary that the cut-off frequency by the coupling condenser 11 is determined less than about one tenth of a data sampling frequency (for example, 41.3 KHz) inherent to the sampled servo format so as to accurately reproduce the signal wave. This means that the coupling time constant of the condenser 11 must be relatively large. When, as a result, the read-out RF signal passes through the condenser 11, the DC component of the RF signal cannot be completely eliminated. Thus, the output signal (d) from the amplifier 12 has such a waveform as shown in FIG. 4(B). Namely, a reference level of the read-out RF signal largely deviates from the ground level at the time of the reproducing mode immediately after the end of the recording mode as seen from FIG. 4(B). It is therefore necessary that the A/D converting circuit 13 should have an input dynamic range converting a possible amplitude variation range of the signal which is deviated in the negative direction from the ground level so as to effectively perform the A/D conversion. If, to the contrary, the input dynamic range is relatively narrow, the resolution decreases due to such deviation of the DC level of the amplified RF signal.

OBJECT AND SUMMARY OF THE INVENTION

An object of the present invention is therefore to provide a read-out information signal processing circuit which is capable of avoiding the stepwise variations of the DC level of the RF signal even upon the transient time from the recording mode to the reproducing mode, and of effectively using the dynamic range of the A/D converting circuit.

According to the present invention there is provided a read-out information signal processing circuit in an optical recording and reproducing system which records an information signal during a recording mode and reproduces a recorded information signal on a recording medium during a reproducing mode, comprising: switching device for relaying the read-out information signal, DC interrupt means for interrupting a DC component contained in the read-out information signal relayed by the switching device, A/D converting means for A/D converting an output signal of the DC interrupt means, and control means for turning off the switching device during a recording mode.

BRIEF DESCRIPTION OF THE DRAWINGS

FIG. 1 is a block diagram showing a conventional read-out information signal processing circuit.

FIG. 2(A) and FIG. 2(B) are diagrams respectively showing waveforms of signals appearing at input and output sides of the coupling condenser of FIG. 1.

FIG. 8(A) through FIG. 8(F) are diagrams respectively showing waveforms of signals appearing at various parts of the circuit of FIG. 7.

DETAILED DESCRIPTION OF THE EMBODIMENT

Figure 3:
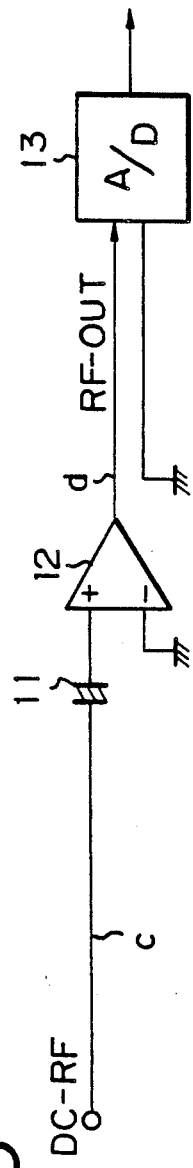
FIG. 3 is a block diagram showing another conventional read-out information signal processing circuit.
Figure 4A:
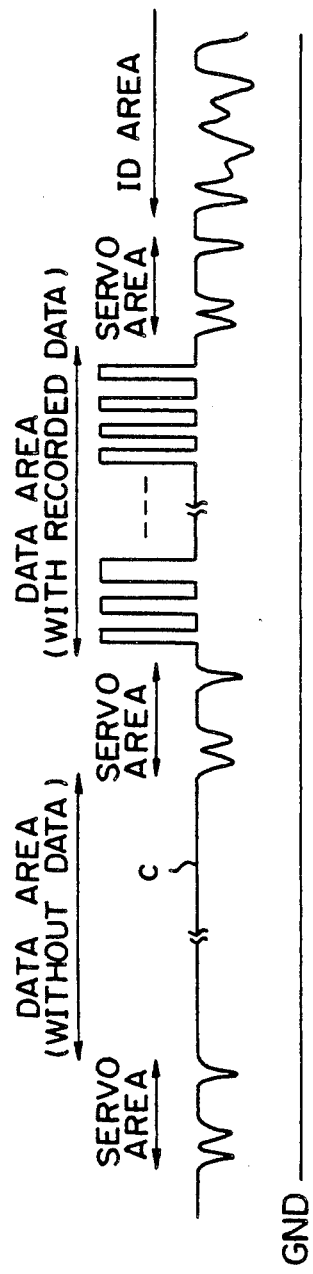
FIG. 4(A) and FIG. 4(B) are diagrams respectively showing waveforms appearing at leading and succeeding stages of the coupling condenser of FIG. 3.
Figure 4B:
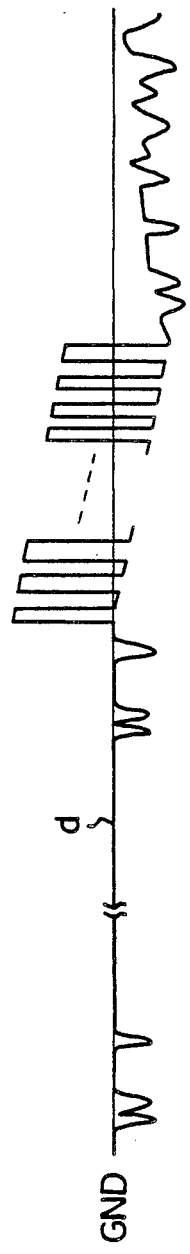
Figure 5:
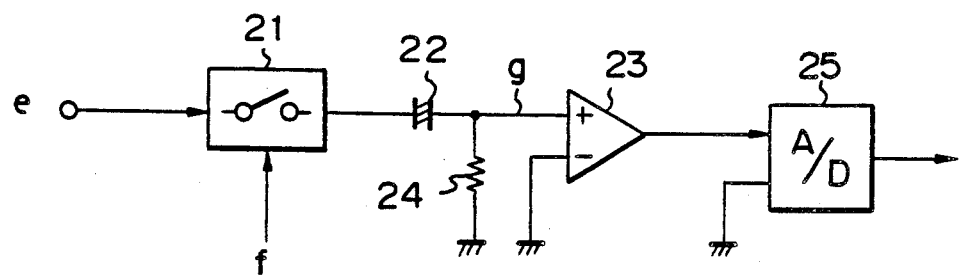
FIG. 5 is a block diagram showing a read-out information signal processing circuit according to the present invention.

An embodiment of the present invention will be explained hereinbelow with reference form FIG. 5 to FIG. 8. FIG. 5 is block diagram showing a read-out information signal processing circuit according to the present invention to be incorporated in a write once type disc recording and reproducing system. In FIG. 5, an RF signal (e) generated from a pickup (not shown) in a system which performs recording and reproducing on a write once type disc, for example, is supplied to an amplifier 23 through an analog switch 21 and a coupling condenser 22 for DC interrupting. A resistor 24 is connected between an input terminal of the amplifier 23 and the ground. An output signal of the amplifier 23 is supplied to an A/D converting circuit 25. An output signal of the A/D converting circuit 25 is supplied to a demodulation circuit (not shown). A mode control signal which becomes a high level, for example, at the time of the reproduction is supplied from a control circuit (not shown) to an input control terminal of the analog switch 21 as an ON-command signal (f).

Figures 6A, 6B, 6C:
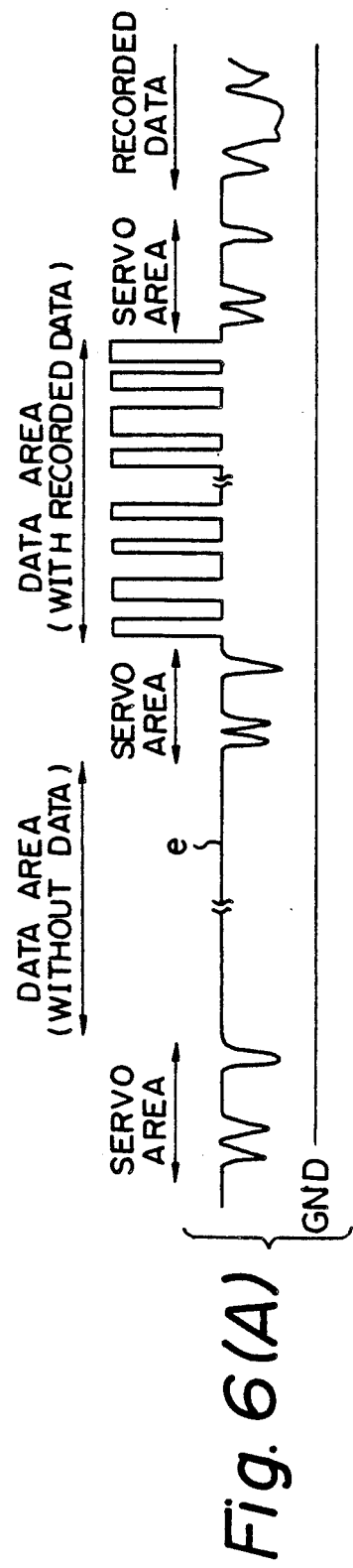
FIG. 6(A) through FIG. 6(C) are diagrams respectively showing waveforms of signals appearing within the circuit of FIG. 5.

With the above described arrangement, the RF signal (e) which is supplied to the analog switch 21 varies as shown in FIG. 6(A), which corresponds to a reproduction period for a first block without any data, a recording period for the succeeding block, and another reproduction period for the still succeeding block.

The ON-command signal (f) is supplied from the control circuit to the analog switch 21 during any periods excluding the recording period as seen from FIG. 6(B). Thus, during the reproduction period, the analog switch 21 becomes ON state, and the input signal (g) of the amplifier 23 varies around the ground level as shown in FIG. 6(C). During the recording period, the signal (e) is not supplied to the amplifier 23, and the input signal (g) of the amplifier 23 becomes equal to the ground level because the analog switch 21 becomes OFF state. At the same time, the storage charge of the condenser 22 does not vary because a current is not supplied to the condenser 22, and a voltage between the electrodes of the condenser 22 does not vary. When, therefore, the analog switch 21 takes the ON state at the beginning of the reproduction mode immediately after the recording mode, the electric potential of the input terminal of the amplifier 23 becomes equal to the level of the previous reproducing mode performed before the recording mode. Since, therefore the reference level of the RF signal during the recording mode is kept, the amplifier 23 is not saturated and the input signal of the A/D converting circuit 25 does not deviate from a predetermined dynamic range.

Figure 7:
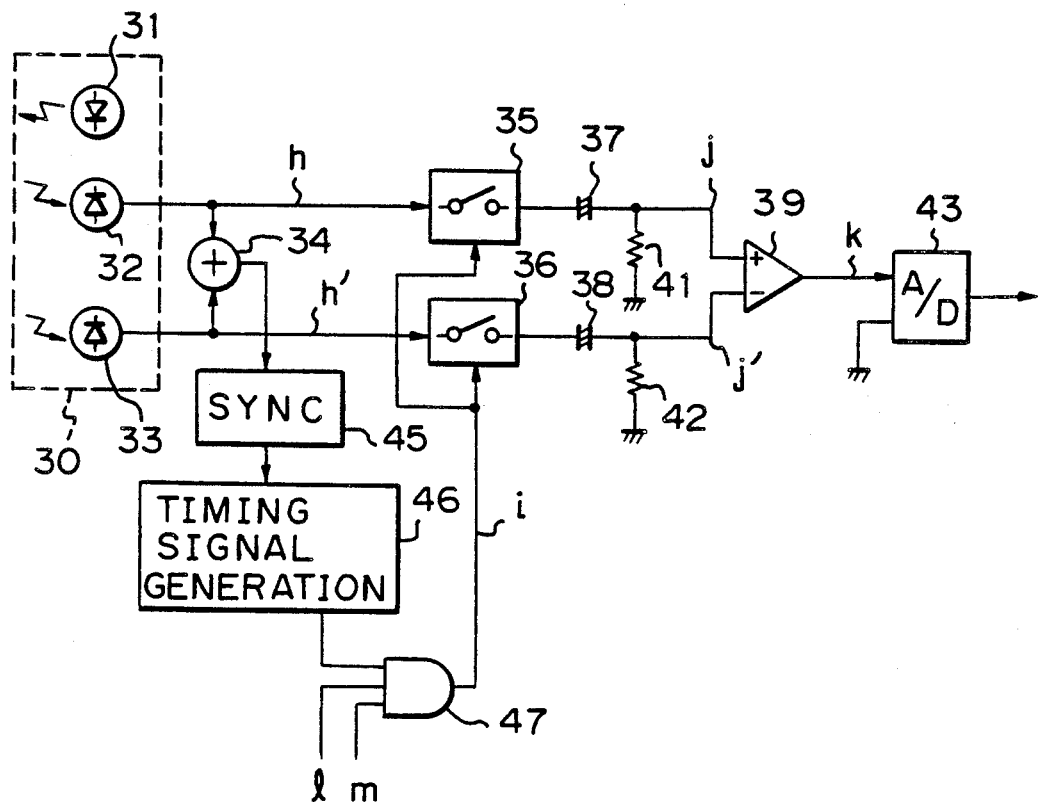
FIG. 7 is a block diagram showing another read-out information signal processing circuit according to the present invention.

FIG. 7 is block diagram showing another read-out information signal processing circuit according to the present invention applied to an optical-magneto disc recording and reproducing system. In FIG. 7, an optical-magneto pickup 30 includes a semiconductor laser 31 as a light source and a light receiving devices 32 and 33. The light receiving devices 32 and 33, for example, detect laser which is generated from the semiconductor laser 31 and is reflected by an optical-magneto disc (not shown) through each analyzer. The one of the light receiving devices 32 and 33 detects a positive direction component of the Karr rotary angle, the other of the light receiving devices 32 and 33 detects a negative direction component of the Karr rotary angle.

Read-out RF signals (h) and (h') produced from the light receiving devices 32 and 33 are added on each other by an adder 34, an emboss pit reproduction signal is formed in accordance with the diffraction of the light resulting from the emboss pits in the servo area. At the same time, the RF signals (h) and (h') are supplied to positive and negative input terminals of a differential amplifier 39 through analog switchs 35 and 36 and DC interruption condensers 37 and 38. Resistors 41 and 42 are connected between the positive and negative input terminals and the ground.

An output signal (k) of the differential amplifier 39 is supplied to a demodulation circuit (not shown) after being converted into a digital signal by an A/D converting circuit 43.

The emboss pit reproduction signal is supplied to a sync circuit 45 which generates a segment sync signal and a sector sync signal in accordance with the emboss pit reproduction signal. The segment sync signal and the sector sync signal generated from the sync circuit 45 are supplied to a timing signal generation circuit 46 which generates a low level signal on the basis of the both sync signals during a period corresponding to the servo area. The output signal of the timing signal circuit 46 is supplied to one input terminal of an AND gate 47. A recording command signal (1) of a low level and an erasing command signal (m) generated from a system controller (not shown) or the like are supplied to other input terminal of the AND gate 47.

A high level signal generated from the AND gate 47 is supplied to each control input terminal of the analog switchs 35 and 36 as an ON-command signal.

With the above described arrangement, the read-out RF signals (h) and (h') as shown in FIG. 8(A) and FIG. 8(B) are produced by the light receiving devices 32 and 33. The RF signals (h) and (h') may be obtained in the optical-magneto disc system when a reproduction operation is made for a first block without any data, a recrodal operation for a succeeding block, and again a reproduction operation for a still succeeding block with recorded data.

In the optical-magneto disc system, during the reproduction period of the servo area, two signals as the read-out RF signals (h) and (h') which are formed by the diffractin in the same manner as in the case of the write once type disc, are produced from the light receiving devices 32 and 33. The two RF signals (h) and (h') are in-phase to each other. During the reproduction period for the block with recorded data, the two RF signals (h) and (h') which are produced from the light receiving devices 32 and 33 are antiphase to each other. These antiphase RF signals (h) and (h') are supplied to the differential amplifier 39 through the analog switches 35 and 36 and condensers 37 and 38, and are amplified. These antiphase RF signals (h) and (h') are obtained by detecting small variations of the Karr rotary angle (the so-called Karr effect) of the medium, so that the levels of the antiphase RF signals are smaller than the in-phase RF signals with each other of the servo area. Thus, the gain of the differential amplifier 39 is to be selected far higher than the circuit in the write once type disc system (by several ten times).

On the other hand, the ON-command signal (i) is supplied from the AND gate 47 to the analog switchs 35 and 36 during periods excluding the reading period of the servo area, the recording period, and the erasing period as seen from FIG. 8(C). The analog switches 35 and 36 become OFF state during not only the recording period and the erasing period but also the reading-out period of the servo area. Therefore, the potential variations in the both input terminals of the differential amplifier 39 do not occur at the times of the recording mode and the erasing mode. The diffraction signal obtained from the servo area which is several ten times as high as the amplitude of the data to be recorded, is not supplied to the both input terminals of the differential amplifier 39, so that the potential variations by the diffractin signal do not occur. Thus, the positive and negative side input signals (j) and (j') of the differential amplifier 39 become a signal to vary around the ground level in accordance with only the previously recorded data as shown in FIG. 8(D) and FIG. 8(E). The output signal (k) of the differential amplifier 39 has such a waveform as shown in FIG. 8(F), the differential amplifier 39 do not saturate, and the input signal of the A/D converting circuit 43 do not deviate from a predetermined dynamic range.

It will be apparent from the foregoing, in the read-out information signal processing circuit according to the present invention, the switching device is disposed to relay the RF signal which is read out from the recording medium, the RF signal from the switching device is supplied to the A/D converting circuit through DC interrupt means, and the switching device becomes OFF state at the recording period. Thus, the possible variations of DC level supplied to the A/D converting circuit at the transient time from the recording mode to the reproducing mode is avoided, and the dynamic range of the A/D converting circuit can be effectively used.

In case of using a optical-magneto disc as the recording medium described above which is alternately arranged a servo area including emboss pits for generating a servo error signal and a data area for recording information, the possible variations of input DC level of the A/D converting circuit can be also avoided by turning off the switching device during the recording period for the data area, the erasing period for the data area and the reading-out period for the servo area.

What is claimed is:

1. A recording and reproducing system which drives an optical recording medium having servo areas disposed thereon and positioned at spacings corresponding to a predetermined frequency to produce a servo signal, wherein the system is adapted to record an information signal at data areas on the optical recording medium by directing a recording beam onto the optical medium during a recording mode and to read the servo signal and the information signal during a reproducing mode, the system comprising:

a switching device for relaying at least a read information signal produced by an optical beam reflected from the optical medium;

DC interrupt means for interrupting a DC component contained in the read information signal relayed by the switching device;

A/D converting means for A/D converting a signal from the DC interrupt means; and control means for causing the switching device to turn off so as to interrupt the read information signal during the recording mode.

2. A recording and reproducing system as set forth in claim 1, wherein the control means causes the switching device to turn off during an erasing period of the information for the data area.

3. A recording and reproducing system as claimed in claim 1, further comprising timing signal generating means disposed at a stage preceding the switching device for generating a timing signal in response to the servo signal, wherein the control means causes the switching device to turn off so as to interrupt said servo signal.

* * * * *